(12) United States Patent
Kelley et al.

(10) Patent No.: US 10,036,475 B2
(45) Date of Patent: Jul. 31, 2018

(54) LUBRICATION SYSTEM FOR A GATE VALVE

(71) Applicant: Emerson Vulcan Holding LLC, St. Louis, MO (US)

(72) Inventors: John D. Kelley, Reno, NV (US); Kirk W. Moore, Reno, NV (US)

(73) Assignee: Emerson Vulcan Holding LLC, St. Louis, MO (US)

( * ) Notice: Subject to any disclaimer, the term of this patent is extended or adjusted under 35 U.S.C. 154(b) by 0 days.

(21) Appl. No.: 15/363,644

(22) Filed: Nov. 29, 2016

(65) Prior Publication Data

US 2017/0074410 A1    Mar. 16, 2017

Related U.S. Application Data

(63) Continuation of application No. 14/295,038, filed on Jun. 3, 2014, now Pat. No. 9,541,202.

(60) Provisional application No. 61/830,451, filed on Jun. 3, 2013.

(51) Int. Cl.
*F16K 3/36* (2006.01)
*F16K 3/02* (2006.01)
*F16N 7/38* (2006.01)
*F16N 13/02* (2006.01)

(52) U.S. Cl.
CPC .............. *F16K 3/36* (2013.01); *F16K 3/0281* (2013.01); *F16N 7/38* (2013.01); *F16N 13/02* (2013.01)

(58) Field of Classification Search
CPC combination set(s) only.
See application file for complete search history.

(56) References Cited

U.S. PATENT DOCUMENTS

| | | | |
|---|---|---|---|
| 2,086,725 A * | 7/1937 | McCausland | F16K 3/36 137/246.13 |
| 2,657,898 A | 11/1953 | Volpin | |
| 3,095,004 A | 6/1963 | Jackson, Jr. et al. | |
| 3,181,552 A * | 5/1965 | Jackson, Jr. | F16K 3/207 137/246.12 |
| 3,190,304 A * | 6/1965 | Volpin | F16K 3/36 137/246.12 |

(Continued)

FOREIGN PATENT DOCUMENTS

DE    3533655 A1    4/1987

OTHER PUBLICATIONS

European Search Report for PCT/US2014040737; dated Jan. 1, 2017; 9 pages.

(Continued)

*Primary Examiner* — Michael A Riegelman
(74) *Attorney, Agent, or Firm* — Quarles & Brady LLP

(57) ABSTRACT

The present invention provides method for providing lubrication to a gate sealing element located between first and second housing sections of a gate valve having a moveable gate, wherein the gate is moved by energizing an actuator. The method includes the steps of providing a lubricant for lubricating the gate sealing element, providing a lubricant passageway for supplying the lubricant to the gate sealing element, providing a moveable plunger element for moving the lubricant from the cartridge to the gate sealing element via the lubricant passageway, and moving the gate to move the plunger element to cause the lubricant to move from the cartridge to the gate sealing element.

19 Claims, 4 Drawing Sheets

(56) References Cited

U.S. PATENT DOCUMENTS

| | | | |
|---|---|---|---|
| 3,428,297 A | | 2/1969 | Volpin |
| 3,665,953 A | * | 5/1972 | Chronister ............ F16K 43/003 |
| | | | 137/246.22 |
| 4,340,204 A | * | 7/1982 | Herd ........................ F16K 3/36 |
| | | | 251/214 |
| 4,962,785 A | * | 10/1990 | Clifford ................ F16K 3/0281 |
| | | | 137/383 |
| 5,020,776 A | * | 6/1991 | Owens .................. F16K 3/0227 |
| | | | 251/327 |
| 5,370,149 A | * | 12/1994 | Clarkson ............... F16K 3/0281 |
| | | | 137/375 |
| 5,890,700 A | | 4/1999 | Clarkson et al. |
| 6,422,535 B1 | * | 7/2002 | Stone .................... F16K 3/0227 |
| | | | 251/327 |
| 2008/0179140 A1 | | 7/2008 | Elliott |
| 2013/0068976 A1 | | 3/2013 | Esveldt |

OTHER PUBLICATIONS

International Search Report and Written Opinion for PCT/US2014/040737; dated Oct. 16, 2014; 7 pages.

\* cited by examiner

LUBRICATION SYSTEM FOR A GATE VALVE

RELATED APPLICATIONS

This application is a continuation of U.S. patent application Ser. No. 14/295,038, filed on Jun. 3, 2014, and entitled "Lubrication System for a Gate Valve", which claims the benefit of U.S. Provisional Patent Application No. 61/830,451, filed on Jun. 3, 2013, the entire disclosures of which are incorporated herein by reference.

BACKGROUND

This invention relates to valves used to control the flow of process media, and more particularly, to a Lubrication system for a gate valve wherein movement of the gate valve causes the movement of lubricant through a lubricant passageway which is then provided to valve sealing members to lubricate the valve sealing members.

Gate valves or knife gate valves are used to control the flow of fluid, such as slurries and other process media, in a pipeline. Such valves include a housing having a fluid passageway and a moveable gate for opening or closing the fluid passageway. The gate is configured to slide between a pair of opposed sealing sleeves that are located within the housing. In an open position, the gate is moved out from between the sealing sleeves thus opening the fluid passageway and enabling the flow of fluid between inlet and outlet ports of the valve. When this occurs, ends of the sealing sleeves move axially and contact each other to form a seal to inhibit leakage of fluid. In a closed position, the gate is moved in between the sealing sleeves to thus close the fluid passageway. In this position, the sealing sleeves seal the gate to inhibit leakage of fluid.

The gate valve may also include a secondary seal to seal the gate valve. The secondary seal acts to inhibit fluid, which may seep through the sealing sleeves, from leaking around the gate or toward an actuator end of the gate valve. It is desirable to lubricate the sealing sleeves in order to optimize performance and extend their life. A technique used to lubricate the sealing sleeves involves applying a lubricant to the secondary seal. Contact between the gate and the secondary seal then transfers lubricant to the gate. The gate then transfers lubricant to the sealing sleeves via contact between the gate and the sealing sleeves. It is desirable to provide improved techniques for lubricating the secondary seal.

BRIEF SUMMARY OF THE INVENTION

In one aspect, the present invention provides a lubrication system for a gate valve having a moveable gate and a gate sealing element located between first and second housing sections. The gate is moved by energizing an actuator. The lubrication system includes a cartridge having a lubricant for lubricating the gate sealing element, a plunger element for moving the lubricant from the cartridge to the gate sealing element, a lubricant passageway located between the plunger element and the gate sealing element for supplying the lubricant moved by the plunger element to the gate sealing element, and a plunger contact member attached to the gate by an attachment element. The plunger contact element engages the plunger element and movement of the gate causes movement of the plunger element to cause the lubricant to move from the cartridge to the gate sealing element.

In another aspect, the present invention provides a lubrication system for a gate valve having a moveable gate and a gate sealing element located between first and second housing sections. The gate is moved by energizing an actuator. The lubrication system includes first and second cartridges each having a lubricant for lubricating the gate sealing element, first and second plunger elements for moving the lubricant from the first and second cartridge, respectively, to the gate sealing element, first and second lubricant passageways located between the first and second plunger elements, respectively, and the gate sealing element for supplying the lubricant moved by the first and second plunger elements to the gate sealing element, and first and second plunger contact members attached to the gate by an attachment element. The first and second plunger contact members engage the first and second plunger elements, respectively, and energizing the actuator causes movement of the gate and corresponding movement of the first and second plunger elements to cause the lubricant to move from the first and second cartridges to the gate sealing element.

In another aspect, the present invention provides a method for providing lubrication to a gate sealing element located between first and second housing sections of a gate valve having a moveable gate that is moved by energizing an actuator. The method includes the steps of providing a lubricant for lubricating the gate sealing element, providing a lubricant passageway for supplying the lubricant to the gate sealing element, providing a moveable plunger element for moving the lubricant from the cartridge to the gate sealing element via the lubricant passageway, and moving the gate to move the plunger element to cause the lubricant to move from the cartridge to the gate sealing element.

In a further aspect, the present invention provides a method for providing lubrication to a gate sealing element located between first and second housing sections of a gate valve having a moveable gate that is moved by energizing an actuator. The method includes the steps of moving a lubricant through a lubricant passageway utilizing a moveable plunger element, moving the gate to move the plunger element to cause the lubricant to move to the gate sealing element, and providing a clevis attached to the gate, wherein the clevis includes a plunger contact member.

In a yet another aspect, the present invention provides a method for providing lubrication to a gate sealing element located between first and second housing sections of a gate valve having a moveable gate that is moved by energizing an actuator. The method includes the steps of providing a lubricant for lubricating the gate sealing element, the lubricant being disposed within a lubricant cartridge and providing a lubricant passageway for supplying the lubricant to the gate sealing element. The method further includes the steps of providing a moveable plunger element for moving the lubricant from the lubricant cartridge to the gate sealing element via the lubricant passageway, providing a clevis attached to the gate, wherein the clevis includes a plunger contact member, and moving the gate to move the plunger element to cause the lubricant to move from the lubricant cartridge to the gate sealing element.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION OF THE INVENTION

Figure 1:
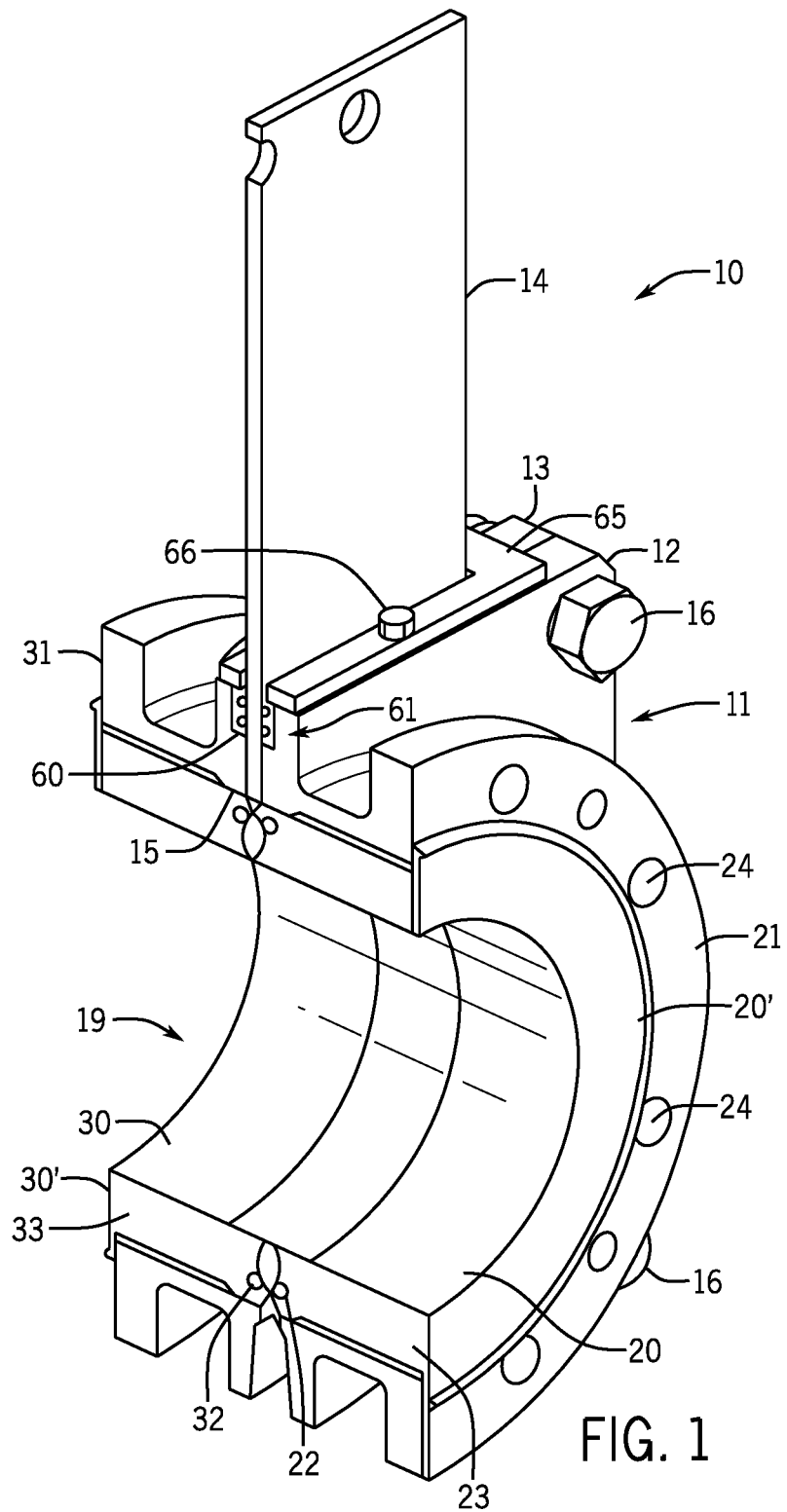
FIG. 1 is a perspective cross-sectional view of an exemplary embodiment of a gate valve.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Referring to FIG. 1 a perspective cross-sectional view of an exemplary embodiment of a gate valve 10. The valve 10 includes a housing 11 defining an interior fluid passageway 19 through which a fluid or process media such as slurry flows. Housing 11 is comprised of first 12 and second 13 opposed housing sections having, for example, generally "U" shaped cross sections which provide a narrow chamber or space of sufficient width to allow a moveable gate 14 to pass therethrough. The first section 12 is rigidly connected to second section 13 via a series of bolts 16 or other fasteners extending through the respective sections. First section 12 includes an outer flange 21 having a series of mounting holes 24 for attachment to a process pipeline. Similarly, second section 13 includes an outer flange 31 having a series of associated mounting holes for attachment to a process pipeline. First 20 and second 30 primary sealing sleeves are mounted in the first 12 and second 13 sections, respectively. The gate 14 is disposed between the first 20 and second 30 sealing sleeves and serves to open and close the fluid passageway 19. In FIG. 1 the valve 10 is shown in an open position. In the open position, the gate 14 is moved out from between the first 20 and second 30 sealing sleeves thus opening the fluid passageway 19 and enabling the flow of fluid through the valve 10. In a closed position, the gate 14 is moved in between the first 20 and second 30 sealing sleeves to thus close the fluid passageway 19 and inhibit the flow of fluid through the valve 10. In this position, the first 20 and second 30 sealing sleeves seal the gate 14 to inhibit leakage of fluid.

The first 20 and second 30 sealing sleeves include first 23 and second 33 annular resilient bodies, respectively, which are fabricated from an elastomeric material such as natural rubber or other suitable synthetic elastomer. The first sealing sleeve 20 is reinforced at its inner end by an annular shaped first stiffener ring 22 which extends around the circumference of the first sealing sleeve 20. Similarly, second sealing sleeve 30 is reinforced at its inner end by an annular shaped second stiffener ring 32 which extends around the circumference of the second sealing sleeve 30. The first 22 and second 32 stiffener rings may be formed from a durable material such as steel, hard polyurethane, etc. The first 20 and second 30 sealing sleeves also include first 20' and second 30' edge portions, respectively. The first 20' and second 30' edge portions contribute to the seal between the process pipeline and the outer flange 21 and to the seal between the process pipeline the outer flange 31, respectively.

The first 12 and second 13 sections include a secondary sealing slot 61 within which a secondary resilient sealing member 60 is disposed. Secondary sealing member 60 may be a unitary molded elastomeric material such as natural rubber or other suitable synthetic elastomer such as polyurethane. Secondary sealing member 60 replaces standard packing material around gate 14 to inhibit leakage and to wipe excess fluid from gate 14 as the gate 14 moves between the open and closed positions. Secondary sealing member 60 is secured to housing 11 by secondary seal retainer plate 65 having a generally rectangular shape around the perimeter of gate 14 and a plurality of bolts 66. While the first 20 and second 30 sealing sleeves prevent direct process media line pressure on the secondary sealing member 60, the secondary seal member 60 is itself capable of withstanding process media spray during actuation of gate 14. The secondary seal 60 is configured to be dynamically self-adjusting. As such, there is no need for constant manual adjustment such as in the case of conventional packing in order to stop valve leakage. The first 20 and second 30 sealing sleeves, first 22 and second 32 stiffener rings as well as secondary sealing member 60 are described in more detail in U.S. Pat. No. 5,890,700, the disclosure of which is hereby incorporated by reference in its entirety.

Figure 2:
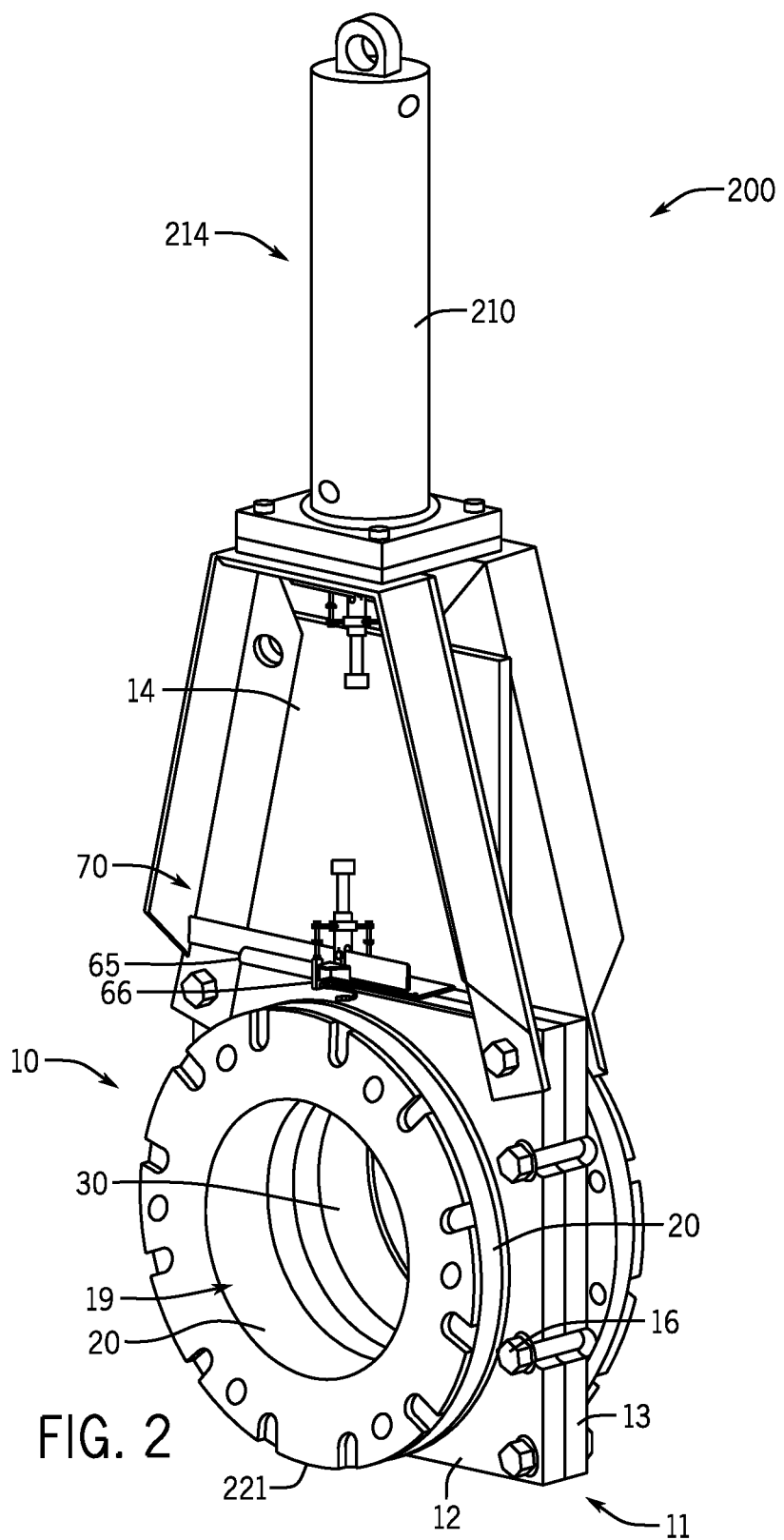
FIG. 2 is a perspective view of a valve assembly including a valve and piston housing disposed at an upper end of the valve assembly.

FIG. 2 is a perspective view of a valve assembly 200 including valve 10 and an actuator 214 for moving the gate 14 in order to open and close the fluid passageway 19. The actuator 214 may be an air cylinder, hydraulic cylinder, electric motor, manual handwheel, manual bevel gear, ratchet or other type of actuator suitable for moving the gate 14. For purposes of illustration, the current invention will be described in connection with an air or hydraulic cylinder type of actuator having a piston housing 210 disposed at an upper end of the valve assembly 200. Piston housing 210 includes a piston rod 212 which is attached to gate 14 by a clevis 68 (see FIG. 3). When the actuator 214 is energized, the piston rod 212 moves in a vertical direction thus moving the gate 14 to open and close the fluid passageway 19. Housing 11 is defined by the first 12 and second 13 sections with sealing edge portion 20' disposed between pipe flange 221 and first section 12. Although the cross section of the first 12 and second 13 sections may have a different cross section from that shown in FIG. 1, the opposing housing sections are rigidly connected via a series of bolts 16 extending through the respective halves. The first 20 and second 30 sealing sleeves are mounted in the first 12 and second 13 sections, respectively. Valve 10 also includes the secondary sealing member 60 disposed above the first 20 and second 30 sealing sleeves. The secondary sealing member 60 is secured by secondary seal retainer plate 65 and a series of bolts 66.

Figure 3:
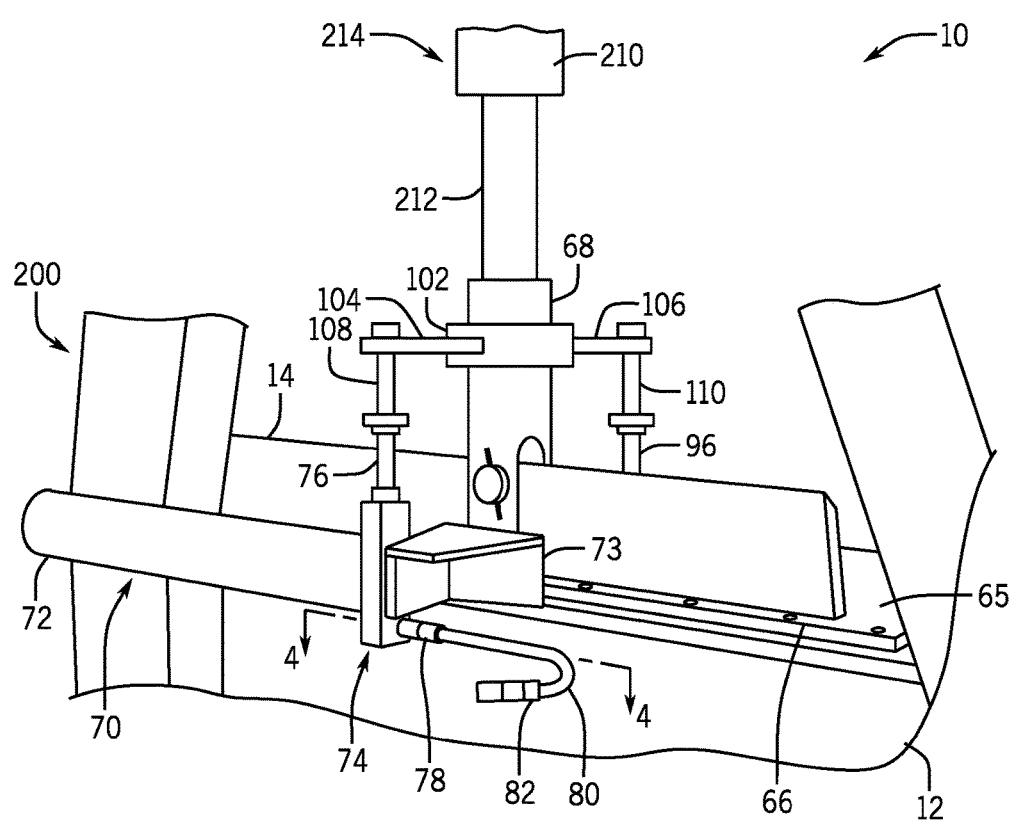
FIG. 3 is an enlarged view of a first lubrication unit in accordance with the invention along with views of portions of the valve assembly.

In accordance with the invention, the valve assembly 200 further includes a first lubrication unit 70 for providing a lubricant for lubricating the secondary sealing member 60 and ultimately the first 20 and second 30 sealing sleeves. Referring to FIG. 3, an enlarged view of the first lubrication unit 70 and portions of the valve assembly 200 is shown. The first lubrication unit 70 is attached to the first section 12 by a bracket assembly 73. The first lubrication unit 70 includes a first cartridge 72 for supplying lubricant such as silicone. The first cartridge 72 is removably attached to a first plunger assembly 74 having a vertically moveable first plunger 76 that is shown in an extended position in FIG. 3. A first outlet 78 of the first plunger assembly 74 is connected by a flexible first conduit 80 to a first inlet fitting 82.

Figure 4:
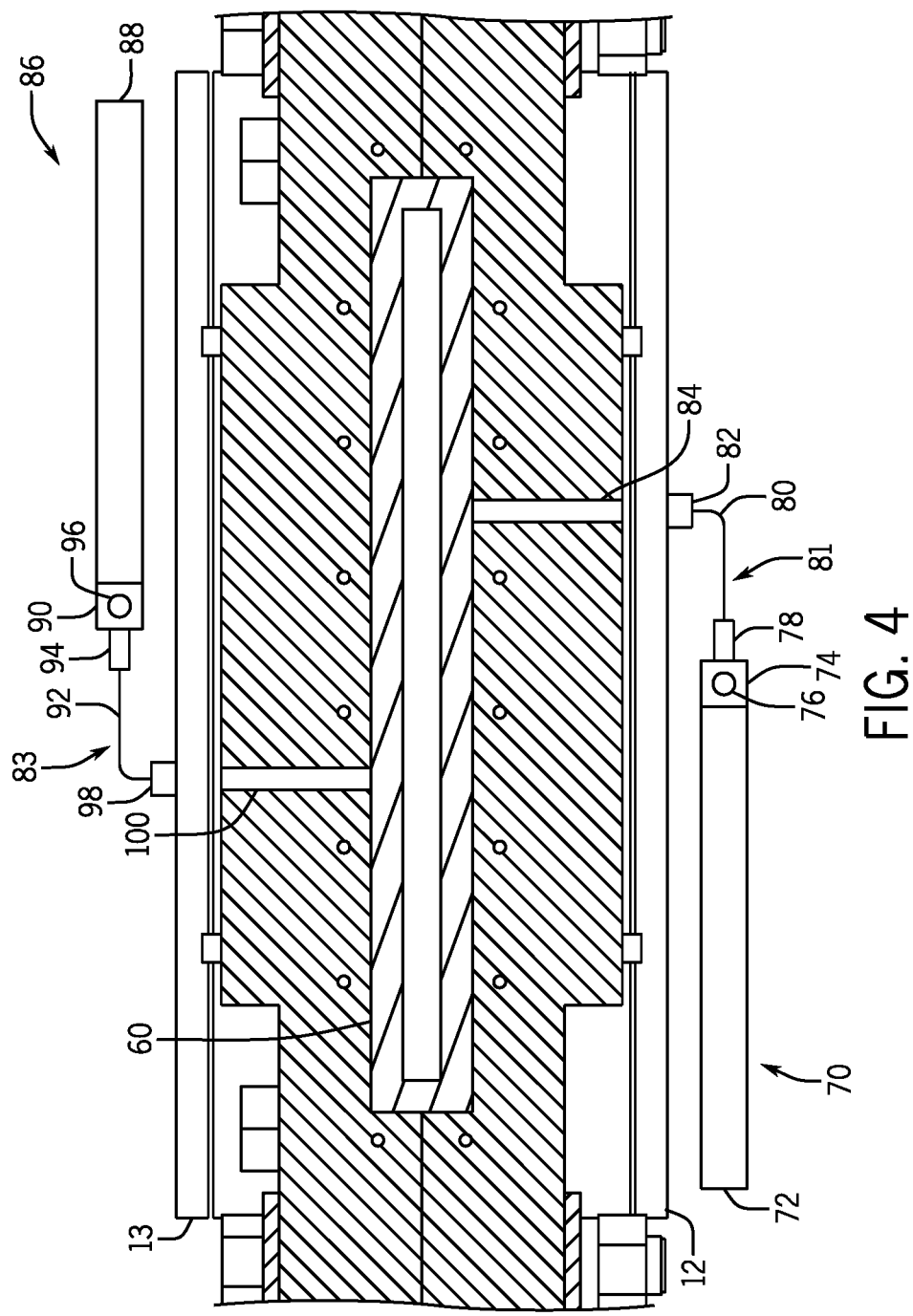
FIG. 4 is a cross sectional view of first and second housing sections along view line 4-4 of FIG. 3.

Referring to FIG. 4 in conjunction with FIG. 3, a cross sectional view of the first 12 and second 13 sections along view line 4-4 of FIG. 3 is shown. A first inlet passage 84 is formed in the first section 12 which extends to the secondary sealing member 60. The first outlet 78, first conduit 80, first inlet fitting 82 and first inlet passage 84 are in fluid communication with the secondary sealing member 60 and form a first lubricant passageway 81. The first plunger assembly 74 is configured as a pump wherein downward movement of the first plunger 76 causes the plunger 76 to retract into the first plunger assembly 74. This causes lubricant to be pumped out of the first cartridge 72. The lubricant then flows through the first outlet 78, first conduit 80, first inlet fitting 82 and first inlet passage 84 and contacts the secondary sealing member 60 thus lubricating the secondary sealing member 60.

The valve assembly 200 may also include a second lubrication unit 86 which is configured similar to the first lubrication unit 70 and includes similar associated elements. The second lubrication unit 86 is attached to the second section 13 by a bracket assembly (not shown for purposes of clarity) similar to bracket assembly 73. The second lubrication unit 86 includes a second cartridge 88 for supplying lubricant such as silicone. The second cartridge 88 is removably attached to a second plunger assembly 90 having a vertically moveable second plunger 96 that is shown in an extended position in see FIG. 3. A second outlet 94 of the second plunger assembly 90 is connected by a flexible second conduit 92 to a second inlet fitting 98. A second inlet passage 100 is formed in the second section 13 which extends to the secondary sealing member 60. The second outlet 94, second conduit 92, second inlet fitting 98 and second inlet passage 100 are in fluid communication with the secondary sealing member 60 and form a second lubricant passageway 83. The second plunger assembly 90 is also configured as a pump wherein downward movement of the second plunger 96 causes the plunger 96 to retract into the second plunger assembly 90. This causes lubricant to be pumped out of the second cartridge 88. The lubricant then flows through the second outlet 94, second conduit 92, second inlet fitting 98 and second inlet passage 100 and contacts the secondary sealing member 60 thus lubricating the secondary sealing member 60.

Referring back to FIG. 3, a clevis clamp 102 is attached to the clevis 68. The clevis clamp 68 includes outwardly extending first 104 and second 106 arms having respective first 108 and second 110 downwardly extending plunger contact members. Movement of the gate 14, due to energizing actuator 214, thus causes corresponding movement of the first 108 and second 110 plunger contact members. The first 108 and second 110 plunger contact members are adapted to engage with the first 76 and second 96 plungers. Thus, downward movement of the first 108 and second 110 plunger contact members causes corresponding downward movement of the first 76 and second 96 plungers into retracted positions. This causes lubricant to be pumped out of the first 72 and second 88 cartridges, respectively, which then flows to the secondary sealing member 60 as previously described. In another embodiment, the clevis clamp 102 may be attached to other members of the valve 10 which move due to the actuator 214 such as piston 212. In yet another embodiment, the first 108 and second 110 plunger contact members may be directly attached to the gate 14 and/or other members of the valve 10 which move due to the actuator 214.

The first 76 and second 96 plungers are spring loaded and are biased to move upward. Thus, upward movement of the gate 14 causes the first 76 and second 96 plungers to back to fully extended positions. In addition, a height of the first 108 and second 110 plunger contact members may be adjusted relative to the first 104 and second 106 arms to ensure suitable contact with the first 76 and second 96 plungers. In one embodiment, the first 108 and second 110 plunger contact members are threaded into the first 104 and second 106 arms to enable height adjustment. The first 108 and second 110 plunger contact members are then locked in place by lock nuts when a suitable height is determined. Alternatively, the first 76 and second 96 plungers may be threaded into the first 74 and second 90 plunger assemblies or both the first 76 and second 96 plungers and the first 108 and second 110 plunger contact members may be threaded and locked in place by lock nuts.

Contact between the gate 14 and the secondary sealing member 60 transfers lubricant from the secondary sealing member 60 to the gate 14. The gate 14 then transfers lubricant to the first 20 and second 30 sealing sleeves via contact between the gate and the first 20 and second 30 sealing sleeves. The lubricant promotes smoother gate action as well as reducing the amount of force necessary to actuate the gate. In addition, lubrication of the first 20 and second 30 sealing sleeves optimizes seal performance and extends the life of the seals.

Thus, the secondary sealing member 60 and the first 20 and second 30 sealing sleeves are lubricated through movement of the gate 14, which moves as a result of energizing actuator 214, and without the use of other devices that would require an electric power source or a battery. In addition. the current invention is able to provide high viscosity lubricants that are recommended for lubricating the secondary sealing member 60 and the first 20 and second 30 sealing sleeves. Further, the current invention may be retrofit into existing gate valves currently in use. The first 70 and second 86 lubrication units may be comprised of commercially available products or may be specially built for use with valve assembly 200. Moreover, the first 72 and second 88 cartridges may be replaced by commercially available cartridges once the lubricant in the first 72 and second 88 cartridges is depleted. This avoids disassembly and reassembly of the valve assembly 200 and corresponding periods of inactivity or down time to lubricate the secondary sealing member 60 and the first 20 and second 30 sealing sleeves and thus provides relatively uninterrupted operation of the valve assembly 200.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations, It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

The invention claimed is:

1. A method for providing lubrication to a gate sealing element located between first and second housing sections of a gate valve having a moveable gate, wherein the gate is moved by energizing an actuator, the method comprising the steps of:
   providing a lubricant for lubricating the gate sealing element;
   providing a lubricant passageway for supplying the lubricant to the gate sealing element;
   providing a moveable plunger element for moving the lubricant from a cartridge to the gate sealing element via the lubricant passageway;
   providing a clevis attached to the gate, wherein the clevis includes a plunger contact member adapted to engage the moveable plunger element to cause movement of the lubricant; and
   moving the gate to move the plunger element to cause the lubricant to move from the cartridge to the gate sealing element.

2. The method according to claim 1, wherein the clevis includes an arm for holding the plunger contact member.

3. The method according to claim 2 further comprising adjusting a height of the plunger contact member relative to the arm.

4. The method according to claim 1 further comprising attaching the plunger element to the first housing section by a bracket.

5. The method according to claim 1, wherein the lubricant passageway includes an inlet passage portion formed in the first housing section.

6. The method according to claim 1 further comprising fabricating the gate sealing element from an elastomeric material.

7. The method according to claim 1, wherein the lubricant is silicone.

8. A method for providing lubrication to a gate sealing element located between first and second housing sections of a gate valve having a moveable gate, wherein the gate is moved by energizing an actuator, the method comprising the steps of:
   moving a lubricant through a lubricant passageway utilizing a moveable plunger element;
   moving the gate to move the plunger element to cause the lubricant to move to the gate sealing element; and
   providing a clevis attached to the gate, wherein the clevis includes a plunger contact member adapted to engage the moveable plunger element to cause movement of the lubricant.

9. The method according to claim 8, further including the step of providing the lubricant in a lubricant cartridge.

10. The method according to claim 8, wherein the clevis includes an arm for holding the plunger contact member.

11. The method according to claim 10 further comprising the step of adjusting a height of the plunger contact member relative to the arm.

12. The method according to claim 8 further comprising the step of attaching the plunger element to the first housing section by a bracket.

13. The method according to claim 8, wherein the lubricant passageway includes an inlet passage portion formed in the first housing section.

14. The method according to claim 8 further comprising fabricating the gate sealing element from an elastomeric material.

15. A method for providing lubrication to a gate sealing element located between first and second housing sections of a gate valve having a moveable gate, wherein the gate is moved by energizing an actuator, the method comprising the steps of:
   providing a lubricant for lubricating the gate sealing element, the lubricant being disposed within a lubricant cartridge;
   providing a lubricant passageway for supplying the lubricant to the gate sealing element;
   providing a moveable plunger element for moving the lubricant from the lubricant cartridge to the gate sealing element via the lubricant passageway;
   providing a clevis attached to the gate, wherein the clevis includes a plunger contact member adapted to engage the moveable plunger element to cause movement of the lubricant through the lubricant passageway to the gate sealing element; and
   moving the gate to move the plunger element to cause the lubricant to move from the lubricant cartridge to the gate sealing element.

16. The method according to claim 15, wherein the clevis includes an arm for holding the plunger contact member.

17. The method according to claim 16 further comprising the step of adjusting a height of the plunger contact member relative to the arm.

18. The method according to claim 15 further comprising the step of attaching the plunger element to the first housing section by a bracket.

19. The method according to claim 15, wherein the lubricant passageway includes an inlet passage portion formed in the first housing section.

* * * * *